(12) United States Patent
Inagaki et al.

(10) Patent No.: US 9,982,775 B2
(45) Date of Patent: May 29, 2018

(54) HYDRAULIC CONTROL CIRCUIT FOR VEHICLE POWER TRANSMISSION DEVICE

(71) Applicant: TOYOTA JIDOSHA KABUSHIKI KAISHA, Toyota-shi, Aichi-ken (JP)

(72) Inventors: Takafumi Inagaki, Toyota (JP); Yoshinobu Soga, Toyota (JP); Shuji Moriyama, Nagakute (JP); Yoshihiro Mizuno, Nagoya (JP); Hiromitsu Nitani, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/509,114

(22) PCT Filed: Sep. 7, 2015

(86) PCT No.: PCT/IB2015/001527
§ 371 (c)(1),
(2) Date: Mar. 6, 2017

(87) PCT Pub. No.: WO2016/038439
PCT Pub. Date: Mar. 17, 2016

(65) Prior Publication Data
US 2017/0350500 A1 Dec. 7, 2017

(30) Foreign Application Priority Data
Sep. 9, 2014 (JP) .................................. 2014-183462

(51) Int. Cl.
*F16H 61/12* (2010.01)
*F16H 61/02* (2006.01)
*F16H 61/662* (2006.01)

(52) U.S. Cl.
CPC ......... *F16H 61/0206* (2013.01); *F16H 61/12* (2013.01); *F16H 61/66259* (2013.01);
(Continued)

(58) Field of Classification Search
None
See application file for complete search history.

(56) References Cited

U.S. PATENT DOCUMENTS 5,365,437 A * 11/1994 Cunningham ...... F16H 61/0021
307/118
5,591,102 A * 1/1997 White .................. B60W 10/06
477/107
(Continued)

FOREIGN PATENT DOCUMENTS

CN 101561044 A 10/2009
EP 0699851 A1 3/1996
(Continued)

*Primary Examiner* — Dirk Wright
(74) *Attorney, Agent, or Firm* — Oliff PLC

(57) ABSTRACT

Ground wires are shared between a drive-side pulley solenoid valve and a driven-side pulley solenoid valve. Therefore, when a disconnection or short circuit occurs in the shared portion, a drive-side pulley and a driven-side pulley show substantially the same behavior. As a result, changes in the speed ratio γcvt of a continuously variable transmission are suppressed and changes in vehicle behavior are also suppressed. Therefore, it is possible to suppress the degradation of drivability during the failure of the solenoid valves involved in power transmission.

9 Claims, 6 Drawing Sheets

(52) U.S. Cl.
CPC . *B60Y 2410/115* (2013.01); *F16H 2061/1252* (2013.01); *F16H 2061/1268* (2013.01)

(56) References Cited

U.S. PATENT DOCUMENTS

| | | |
|---|---|---|
| 2009/0264231 A1 | 10/2009 | Ogata et al. |
| 2013/0041563 A1 | 2/2013 | Komiya et al. |
| 2015/0087463 A1 | 3/2015 | Nakagawa et al. |

FOREIGN PATENT DOCUMENTS

| | | |
|---|---|---|
| EP | 1375979 A2 | 1/2004 |
| JP | S58-133935 A | 8/1983 |
| JP | 2009-257528 A | 11/2009 |
| JP | 2013-036589 A | 2/2013 |
| WO | 2013/176208 A1 | 11/2013 |

\* cited by examiner

F I G . 1
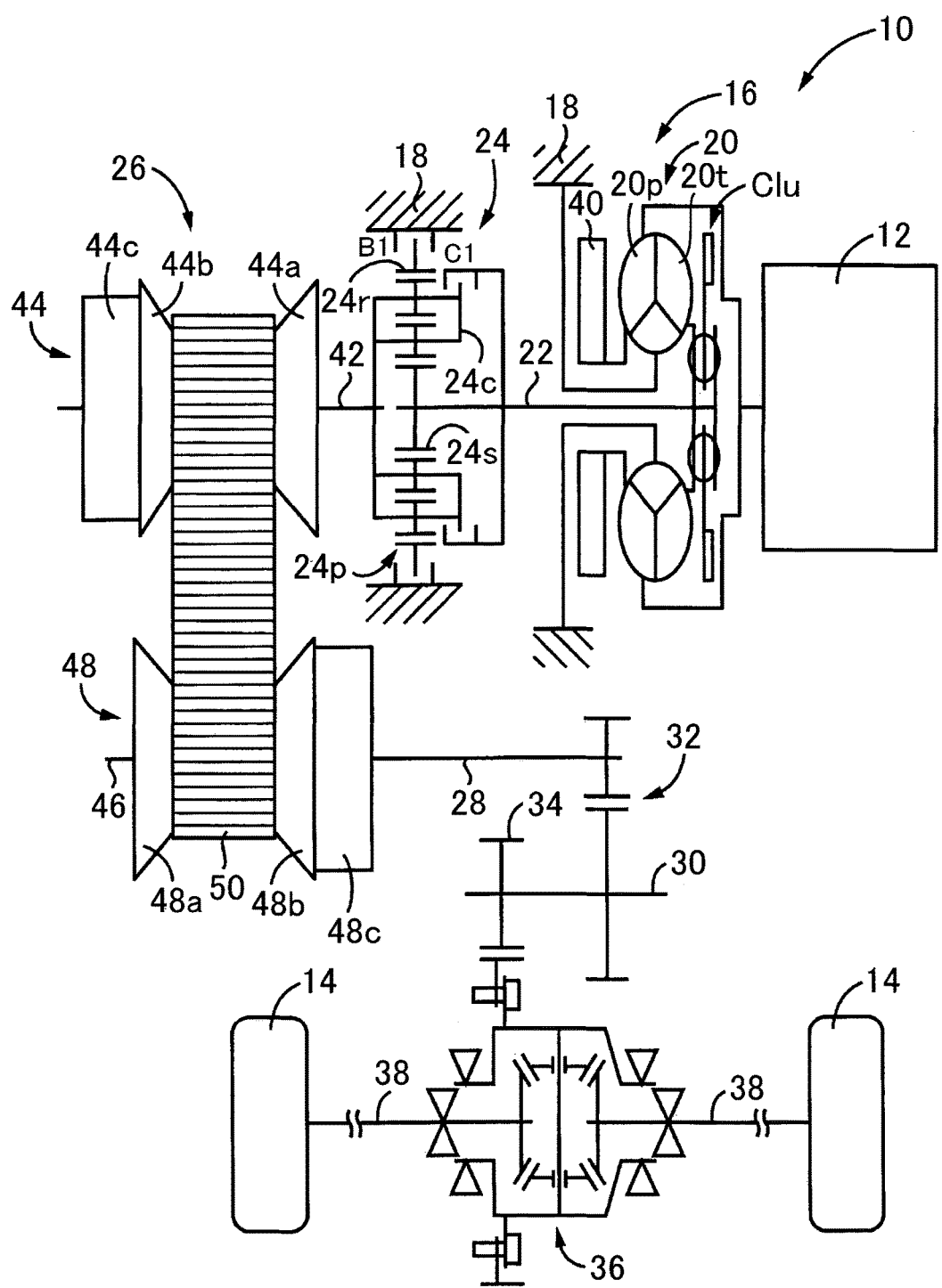

HYDRAULIC CONTROL CIRCUIT FOR VEHICLE POWER TRANSMISSION DEVICE

BACKGROUND OF THE INVENTION

1. Field of the Invention

The invention relates to a hydraulic control circuit for a vehicle power transmission device equipped with a continuously variable transmission mechanism, or to a hydraulic control circuit for a vehicle power transmission device equipped with two transmission mechanisms provided in parallel between a drive power source and drive wheels.

2. Description of Related Art

A vehicle power transmission device equipped with two transmission mechanisms provided in parallel between an input rotating member to which power of a drive power source is transmitted and an output rotating member that outputs the power to drive wheels is available. For example, one of such vehicle power transmission devices is disclosed in International Patent Application Publication No. 2013/176208 (WO 2013/176208 A). WO 2013/176208 A discloses a vehicle power transmission device in which a power transmission path through a belt-type continuously variable transmission and a power transmission path through a gear train are provided in parallel between an input shaft and an output shaft. A first clutch and a meshing clutch equipped with a synchronous meshing mechanism for transmitting and cutting off power are provided in the power transmission path through the gear train, and a second clutch for transmitting and cutting off power is provided in the power transmission path through the continuously variable transmission.

Meanwhile, in the case of control objects operated by inducing an interaction, such as a drive-side pulley and a driven-side pulley of a belt-type continuously variable transmission, where a failure (for example, disconnection or short circuit) occurs in a solenoid valve controlling the oil pressure supplied to one control object, it is desirable that the solenoid valve controlling the oil pressure supplied to another control object be rapidly fail-safe operated. However, where a time is required to detect the failure occurring in one solenoid valve, the fail-safe operation cannot be performed in a timely manner and it is possible that the desired vehicle behavior would not be obtained. More specifically, a time is required to distinguish between a normal energization state and a disconnection or short circuit state, and a time is required for a change to occur in the vehicle behavior that can be determined as a failure. Where the fail-safe operation is delayed due to the delay in failure detection, the transmission mechanism can be shifted and drivability can be degraded. Alternatively, where the fail-safe operation is delayed, the power transmission path can be cut off, the desired drive power cannot be ensured (the desired torque cannot be transmitted to the drive wheels), and drivability can be degraded. The above-described problem has not yet been addressed.

SUMMARY OF THE INVENTION

The invention has been created with the foregoing in view and provides a hydraulic control circuit for a vehicle power transmission device that can suppress the degradation of drivability during the failure of a solenoid valve involved in power transmission.

According to a first aspect of the invention, there is provided a hydraulic control circuit for a vehicle power transmission device. The vehicle power transmission device includes: a continuously variable transmission mechanism having a drive-side pulley, a driven-side pulley, and a transmission element wound around the drive-side pulley and the driven-side pulley; and a clutch mechanism that connects and disconnects a power transmission path for transmitting power of a drive power source to drive wheels through the continuously variable transmission mechanism. The hydraulic control circuit includes: a drive-side pulley solenoid valve, a driven-side pulley solenoid valve, and a clutch mechanism solenoid valve. The drive-side pulley solenoid valve is configured to control an oil pressure supplied to the drive-side pulley. The driven-side pulley solenoid valve is configured to control an oil pressure supplied to the driven-side pulley. The clutch mechanism solenoid valve is configured to control an oil pressure supplied to the clutch mechanism. In electric wiring of at least two solenoid valves among the drive-side pulley solenoid valve, the driven-side pulley solenoid valve, and the clutch mechanism solenoid valve either one of a power supply wire and a ground wire is shared between the at least two solenoid valves and an electric circuit incorporated in an electronic control unit provided in a vehicle.

In the hydraulic control circuit, the drive-side pulley solenoid valve and the driven-side pulley solenoid valve may each be a normally open solenoid valve. Further, in the hydraulic control circuit, the drive-side pulley solenoid valve and the driven-side pulley solenoid valve may each be a normally closed solenoid valve.

With the above-described hydraulic control circuit, since either one of the power supply wire and ground wire is shared between the drive-side pulley solenoid valve and the driven-side pulley solenoid valve, when a disconnection or short circuit occurs in the shared portion, the drive-side pulley and the driven-side pulley show substantially the same behavior. As a result, changes in the speed ratio of the continuously variable transmission mechanism are suppressed and changes in vehicle behavior are also suppressed. Further, since either one of the power supply wire and ground wire is shared between the drive-side pulley solenoid valve (or the driven-side pulley solenoid valve) and the clutch mechanism solenoid valve, even when a disconnection (when the clutch mechanism solenoid valve is a normally closed solenoid valve) or short circuit (when the clutch mechanism solenoid valve is a normally open solenoid valve) occurs in the shared portion and a speed ratio of the continuously variable transmission mechanism changes, the oil pressure supplied to the clutch mechanism at a timing close to the change timing of the speed ratio is decreased. As a result, the clutch mechanism is released, and therefore the power transmission path for transmitting the power of the drive power source to the drive wheels through the continuously variable transmission mechanism is cut off and a change in vehicle behavior that is caused by the change in the speed ratio of the continuously variable transmission mechanism is suppressed. Therefore, it is possible to suppress the degradation of drivability during the failure of the solenoid valve involved in power transmission.

According to a second aspect of the invention, there is provided a hydraulic control circuit for a vehicle power transmission device. The vehicle power transmission device includes: a first transmission mechanism and a second transmission mechanism provided in parallel between an input rotating member to which power of a drive power source is transmitted and an output rotating member that outputs the power to drive wheels; a first clutch mechanism that connects and disconnects a first power transmission path for transmitting power of the drive power source to the drive wheels through the first transmission mechanism; and a second clutch mechanism that connects and disconnects a second power transmission path for transmitting power of the drive power source to the drive wheels through the second transmission mechanism. The hydraulic control circuit includes: a fail-safe solenoid valve, a first clutch mechanism solenoid valve, a second clutch mechanism solenoid valve, and a fail-safe valve. The fail-safe solenoid valve is a normally open solenoid valve. The first clutch mechanism solenoid valve is configured to control a first clutch oil pressure supplied to the first clutch mechanism. The second clutch mechanism solenoid valve is configured to control a second clutch oil pressure supplied to the second clutch mechanism. The second clutch mechanism solenoid valve is a normally closed solenoid valve. The fail-safe valve is configured to switch selectively to a first valve position and a second valve position based on an output oil pressure of the fail-safe solenoid valve and to switch to the second valve position at a time of a failure in which the fail-safe solenoid valve outputs a maximum oil pressure. Here, the first valve position connects an oil passage configured to supply an output oil pressure of the second clutch mechanism solenoid valve to an oil passage configured to supply the second clutch oil pressure. The second valve position connects an oil passage configured to supply an oil pressure that is not transferred through the second clutch mechanism solenoid valve and is able to engage the second clutch mechanism, to the oil passage configured to supply the second clutch oil pressure. In electric wiring of the fail-safe solenoid valve and the second clutch mechanism solenoid valve, either one of a power supply wire and a ground wire is shared, the power supply wire being between electric circuits incorporated in an electronic control unit provided in a vehicle, and the ground wire being between the fail-safe solenoid valve and the second clutch mechanism solenoid valve.

With the above-described hydraulic control circuit, since either one of the power supply wire and, ground wire is shared between the normally open fail-safe solenoid valve and the second clutch mechanism solenoid valve, when a disconnection occurs in the shared portion and an output oil pressure of the second clutch mechanism solenoid valve is decreased, the fail-safe valve is switched to the second valve position by the fail-safe solenoid valve which is disconnected at substantially the same time and outputs a maximum oil pressure. As a result, the oil passage for supplying the oil pressure that can engage the second clutch mechanism is connected to the oil passage for supplying the second clutch oil pressure, and therefore the second clutch mechanism can be engaged and drive power can be ensured (torque can be transmitted to the drive wheels) in the second power transmission path. As a consequence, it is possible to suppress the degradation of drivability during the failure of the solenoid valve involved in power transmission.

Further, in the hydraulic control circuit, the fail-safe valve may be configured to: (i) connect an oil passage configured to supply an output oil pressure of the first clutch mechanism solenoid valve to an oil passage configured to supply the first clutch oil pressure in the first valve position, and (ii) connect the oil passage for supplying the first clutch oil pressure to a discharge oil passage in the second valve position. With such a configuration, when a disconnection occurs in the shared portion between the fail-safe solenoid valve and the second clutch mechanism solenoid valve and the fail-safe valve is switched to the second position, the first clutch mechanism is reliably released. As a result, an interlock (a tie-up) caused by connection of the first power transmission path in addition to the second power transmission path can be prevented (avoided).

Further, in the hydraulic control circuit, the second transmission mechanism may be a continuously variable transmission mechanism having a drive-side pulley, a driven-side pulley, and a transmission element wound around the drive-side pulley and the driven-side pulley. With such a configuration, even when a disconnection occurs in the shared portion between the fail-safe solenoid valve and the second clutch mechanism solenoid valve, a torque can be transmitted to the drive wheels in the second power transmission path through the continuously variable transmission mechanism.

Further, in the hydraulic control circuit, the fail-safe solenoid valve may be a drive-side pulley solenoid valve configured to control an oil pressure supplied to the drive-side pulley. With such a configuration, even when a disconnection occurs in the shared portion between the drive-side pulley solenoid valve and the second clutch mechanism solenoid valve, the oil pressure supplied to the drive-side pulley is output from the drive-side pulley solenoid valve and a torque can be transmitted to the drive wheels in the second power transmission path through the continuously variable transmission mechanism.

The hydraulic control circuit may be further provided with a driven-side pulley solenoid valve. The driven-side pulley solenoid valve is a normally open solenoid valve configured to control an oil pressure supplied to the driven-side pulley. Further, in electric wiring of the drive-side pulley solenoid valve, the driven-side pulley solenoid valve, and the second clutch mechanism solenoid valve, either one of a power supply wire and a ground wire is shared, the power supply wire being between electric circuits, and the ground wire being between the drive-side pulley solenoid valve, the driven-side pulley solenoid valve and the second clutch mechanism solenoid valve. With such a configuration, even when a disconnection occurs in the shared portion between the drive-side pulley solenoid valve, driven-side pulley solenoid valve, and second clutch mechanism solenoid valve, a torque can be transmitted to the drive wheels in the second power transmission path through the continuously variable transmission mechanism. Further, since the drive-side pulley and the driven-side pulley show substantially the same behavior, changes in the speed ratio of the continuously variable transmission mechanism are suppressed and changes in vehicle behavior are also suppressed.

Further, in the hydraulic control circuit, the second transmission mechanism may provide a speed ratio on a higher vehicle speed side than a speed ratio formed by the first transmission mechanism. With such a configuration, when a disconnection occurs, in the shared portion between the fail-safe solenoid valve and the second clutch mechanism solenoid valve, a torque can be transmitted to the drive wheels in the second power transmission path in which the speed ratio on a comparatively high vehicle speed side is formed. Therefore, where a failure occurs when the vehicle runs at a high speed, the high-speed running is easily maintained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 illustrates the schematic configuration of the vehicle using the first embodiment of the invention;

DETAILED DESCRIPTION OF EMBODIMENTS

Figure 2:
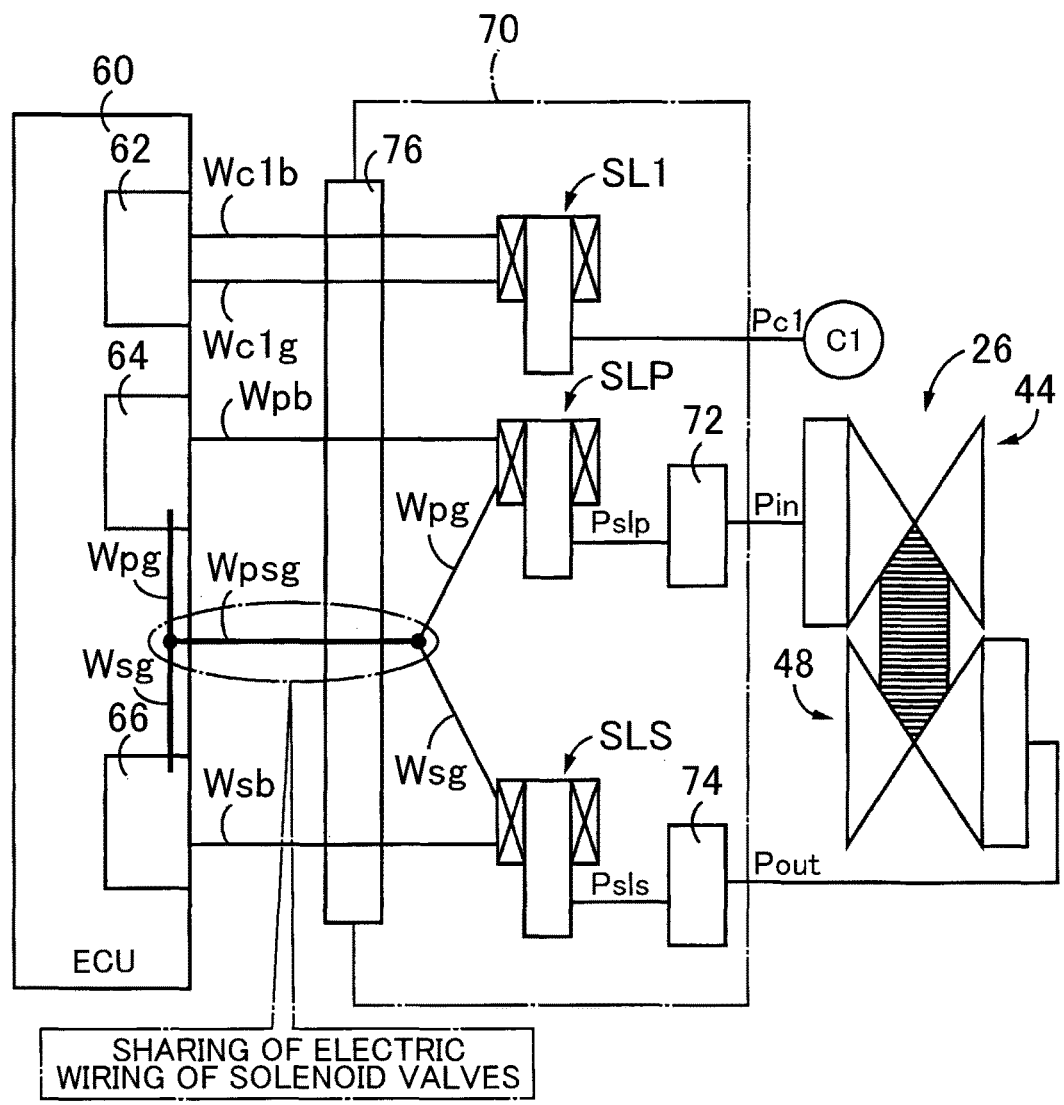
FIG. 2 illustrates a section of an electronic control unit (ECU) that controls the operation relating to a hydraulic control circuit and a section of the hydraulic control circuit that controls an oil pressure relating to the continuously variable transmission and forward clutch in the hydraulic control circuit of the first embodiment.

The embodiments of the invention will be explained hereinbelow in greater detail with reference to the appended drawings.

FIG. 1 illustrates the schematic configuration of a vehicle 10 using the first embodiment of the invention. In FIG. 1, the vehicle 10 is equipped with an engine 12, drive wheels 14, and a vehicle power transmission device 16 (referred to hereinbelow as "the power transmission device 16"). The engine 12 functions as a drive power source for running. The power transmission device 16 is provided between the engine 12 and the drive wheels 14. Conventional torque converter 20, input shaft 22, forward-reverse switching device 24 and also conventional belt-type continuously variable transmission 26 (referred to hereinbelow as "the continuously variable transmission 26"), output shaft 28, countershaft 30, reduction gear device 32, differential gear set 36, and pair of axles 38 are provided inside a housing 18 serving as a non-rotating member. The torque converter 20 functions as a fluid transmission device coupled to the engine 12. The input shaft 22 is coupled to the torque converter 20, and the forward-reverse switching device 24 is coupled to the input shaft 22. The continuously variable transmission 26 is coupled to the forward-reverse switching device 24. The output shaft 28 is the output rotating member of the continuously variable transmission 26. The reduction gear device 32 is constituted by a pair of meshing gears which is provided at the output shaft 28 and the countershaft 30 so as to be incapable of rotating relative thereto. The differential gear set 36 is coupled to a gear 34 which is provided at the countershaft 30 so as to be incapable of rotating relative thereto. The pair of axles 38 is coupled to the differential gear set 36. In the power transmission device 16 configured in the above-described manner, the power (means both the torque and the power, unless the two are specifically discriminated from each other) of the engine 12 is successively transmitted to the pair of drive wheels 14 through the torque converter 20, forward-reverse switching device 24, continuously variable transmission 26, reduction gear device 32, differential gear set 36, and axles 38.

The torque converter 20 is interposed in the power transmission path between the engine 12 and the input shaft 22 and is provided around the input shaft 22 and coaxially with the input shaft 22. The torque converter is equipped with a pump wheel 20p coupled to the engine 12 and a turbine wheel 20t coupled to the input shaft 22. A conventional lockup clutch Clu that can be directly connected between the pump wheel 20p and the turbine wheel 20t, that is, between the input and output rotating members of the torque converter 20, is provided therebetween. The lockup clutch Clu can be switched between three operating states according to the running state of the vehicle 10: the so-called lockup OFF state in which the lockup clutch Clu is released, the so-called lockup slip state in which the lockup clutch Clu is engaged while slipping, and the so-called lockup ON state in which the lockup clutch Clu is completely engaged. A mechanical oil pump 40 that generates an operating pressure when driven by the rotation of the engine 12 is coupled to the pump wheel 20p. The operating pressure is generated for shift-controlling the continuously variable transmission 26, generating a belt squeezing pressure in the continuously variable transmission 26, controlling the operation of the lockup clutch Clu, switching the operation of the forward clutch C1 or a reverse brake B1 provided in the forward-reverse switching device 24, or supplying a lubricating oil to each section of the power transmission path of the power transmission device 16.

The forward-reverse switching device 24 is provided around the input shaft 22 and concentrically with the input shaft 22. The forward-reverse switching device is equipped with a planetary gear device 24p of a double pinion type, the forward clutch C1, and the reverse brake B1. The planetary gear device 24p is a differential mechanism having three rotating elements, namely, a sun gear 24s as an input element, a carrier 24c as an output element, and a ring gear 24r as a counterforce element. The sun gear 24s is integrally coupled to the input shaft 22. The ring gear 24r is selectively coupled to the housing 18 through the reverse brake B1. The carrier 24c is integrally coupled to a drive-side rotating shaft 42 of the continuously variable transmission 26 which is coaxial with the input shaft 22. Further, the sun gear 24s and the carrier 24c are selectively coupled through the forward clutch C1. The forward clutch C1 and the reverse brake B1 are each a conventional hydraulic friction engagement device (friction clutch) which is frictionally engaged by a hydraulic actuator.

In the forward-reverse switching device 24, where the forward clutch C1 is engaged and the reverse brake B1 is released, the input shaft 22 is directly connected to the drive-side rotating shaft 42 and a forward power transmission path is formed. Where the reverse brake B1 is engaged and the forward clutch C1 is released, a reverse power transmission path is formed and the drive-side rotating shaft 42 is rotated in the direction opposite that of the input shaft 22. Where the forward clutch C1 and the reverse brake B1 are both released, the forward-reverse switching device 24 is in the neutral state (power transmission cut-off state) in which power transmission is cut off. The forward clutch C1 is a connection-disconnection device that connects and disconnects the forward power transmission path, and the reverse brake B1 is a connection-disconnection device that connects and disconnects the reverse power transmission path. The forward clutch C1 and the reverse brake B1 constitute a clutch mechanism that connects and disconnects the power transmission path for transmitting the power of the engine 12 to the drive wheels 14 through the continuously variable transmission 26.

The continuously variable transmission 26 is provided with a drive-side pulley 44 which is an input-side pulley (or a primer pulley) with a variable effective diameter that is provided at the drive-side rotating shaft 42, a driven-side pulley 48 which is an output-side pulley (or a secondary pulley) with a variable effective diameter that is provided at a driven-side rotating shaft 46 integrally coupled to the output shaft 28, and a transmission belt 50 serving as a transmission element wound around the pulleys 44 and 48. Power transmission is performed through a friction force acting between the pulleys 44, 48 and the transmission belt 50. In the drive-side pulley 44, the oil pressure (that is, a primary pressure Pin supplied to the drive-side hydraulic cylinder 44c) supplied to the drive-side pulley 44 is adjusted and controlled by a hydraulic control circuit 70 (see FIG. 2) driven by an electronic control unit 60 (see FIG. 2), thereby applying a primary thrust Win (=(primary pressure Pin)× (pressure-receiving surface area)) that changes a V-groove width between sheaves 44a, 44b. Further, in the driven-side pulley 48, the oil pressure (that is, a secondary pressure Pout supplied to the driven-side hydraulic cylinder 48c) supplied to the driven-side pulley 48 is adjusted and controlled by the hydraulic control circuit 70, thereby applying a secondary thrust Wout (=(secondary pressure Pout)×(pressure-receiving surface area)) that changes a V-groove width between sheaves 48a, 48b. In the continuously variable transmission 26, as a result of controlling the primary thrust Win and the secondary thrust Wout, the V-groove width between the pulleys 44, 48 is changed, the applied diameter (effective diameter) of the transmission belt 50 is changed, the speed ratio (corresponds to the gear ratio) γcvt (=(drive-side rotating shaft rotational speed)/(driven-side rotating shaft rotational speed)) is continuously changed, and a friction force (belt squeezing force) between the pulleys 44, 48 and the transmission belt 50 is controlled such as to prevent the transmission belt 50 from slipping.

In this case, in the continuously variable transmission 26, the actual speed ratio γcvt is set to a target speed ratio, while preventing the transmission belt 50 from slipping, by controlling the primary pressure Pin (same meaning as the primary thrust Win) and the secondary pressure Pout (same meaning as the secondary thrust Wout). In other words, in the continuously variable transmission 26, the target speed ratio is realized by the mutual relationship of the primary thrust Win and the secondary thrust Wout, while preventing the belt from slipping by the primary pressure Pin and the secondary pressure Pout, and the target shift is not realized only by the pulley pressure on one side. Therefore, when a solenoid valve inside the hydraulic control circuit 70 that controls the pulley pressure on one side fails (for example, the valve is disconnected or short circuited), the speed ratio γcvt can be changed. In such a case, measures against the occurrence of a failure can be taken by executing a fail-safe operation. In a controllable fail-safe operation, for example, the occurrence of a failure is detected (recognized), and a solenoid valve inside the hydraulic control circuit 70 that controls the pulley pressure on the other side is controlled. However, a determination time is required for distinguishing between the normal energized state and cut-off state of the solenoid valves, or the pulley pressure changes after the solenoid valve fails. For this reason, the hydraulic cylinder changes, the speed ratio γcvt changes, and a time is required for the drive-side rotating shaft rotational speed to change to or above a failure detection threshold, or a response time is required until a fail operation is actually started after the failure detection. As a result, adequate measures are not taken against the failure, the continuously variable transmission 26 can shift, and drivability can be degraded.

In this regard, it has been noticed that where a portion of the electric wiring of the solenoid valves is shared, when a failure occurs in the shared portion, the vehicle behavior associated with the solenoid valves involved in the sharing occurs at substantially the same time, and it has been found that adequate measures can be taken against the occurrence of the failure, without detecting the failure in a controlled manner. The first embodiment of the invention provides the hydraulic control circuit 70 for the power transmission device 16 that makes it possible to suppress the degradation of drivability during the failure of the solenoid valves involved in power transmission.

FIG. 2 illustrates a section of the electronic control unit 60 that controls the operation relating to the hydraulic control circuit 70 and a section of the hydraulic control circuit 70 that controls an oil pressure relating to the continuously variable transmission 26 and the forward clutch C1. In FIG. 2, the vehicle 10 is provided with the electronic control unit 60 and the hydraulic control circuit 70.

The electronic control unit 60 is configured to include the so-called microcomputer provided, for example, with a central processing unit (CPU), a random access memory (RAM), a read only memory (ROM), and an input/output interface. The CPU executes various types of control of the power transmission device 16 by performing signal processing according to a program, which has been stored in advance in the ROM, while using the temporary storage function of the RAM. The electronic control unit 60 executes the output control of the engine 12, the shift control and belt squeezing pressure control of the continuously variable transmission 26, and the engagement control of the forward clutch C1 and reverse brake B1. The electronic control unit can be configured, when necessary, separately for engine control and hydraulic control. Various actual values such as revolution speeds based on detection signals of sensors, such as revolution speed sensors (not depicted in the figure) provided at the vehicle 10, are supplied to the electronic control unit 60. Further, an engine output control command signal for the output control of the engine 12 and a hydraulic control command signal for controlling the shift in the continuously variable transmission 26 and the forward-reverse switching device 24 and also for performing hydraulic control relating to the switching of the operation state of the lockup clutch Clu are output from the electronic control unit 60.

The hydraulic control circuit 70 is provided with a drive-side pulley solenoid valve SLP, a driven-side pulley solenoid valve SLS, and a C1 clutch solenoid valve SL1. The drive-side pulley solenoid valve SLP controls a primary pressure Pin which is an oil pressure supplied to the drive-side pulley 44. The driven-side pulley solenoid valve SLS controls a secondary pressure Pout which is an oil pressure supplied to the driven-side pulley 48. The C1 clutch solenoid valve SL1 functions as a solenoid valve for a clutch mechanism that controls a C1 clutch pressure Pc1 which is an oil pressure supplied to the forward clutch C1. The hydraulic control circuit 70 is also provided with a primary pressure control valve 72, a secondary pressure control valve 74, and a wire connector 76. The solenoid valves SLP, SLS, and SL1 are each a linear solenoid valve driven by a hydraulic control command signal (drive current) output from the electronic control unit 60. The primary pressure control valve 72 is operated on the basis of a control oil pressure Pslp output from the drive-side pulley solenoid valve SLP to adjust the primary pressure Pin. The secondary pressure control valve 74 is operated on the basis of a control oil pressure Psls output from the driven-side pulley solenoid valve SLS to adjust the secondary pressure Pout. The wire connector 76 is a conventional connector that connects and disconnects, in an out of the hydraulic control circuit 70, wires W that electrically connect the solenoid valves SLP, SLS, and SL1 to the electronic control unit 60. The wires W are, for example, a power supply wire Wc1b and a ground wire Wc1g for a drive current of the C1 clutch solenoid valve SL1 which is output from an electric circuit 62 incorporated in the electronic control unit 60. The wires W are also, for example, a power supply wire Wpb and a ground wire Wpg for a drive current of the drive-side pulley solenoid valve SLP which is output from an electric circuit 64 incorporated in the electronic control unit 60. Further, the wires W are also, for example, a power supply wire Wsb and a ground wire Wsg for a drive current of the driven-side pulley solenoid valve SLS which is output from an electric circuit 66 incorporated in the electronic control unit 60. Where the primary pressure control valve 72 and the secondary pressure control valve 74 have the same pressure adjustment characteristic with respect to the value of the control oil pressure, the solenoid valves SLP and SLS are each a normally open solenoid valve or a normally closed solenoid valve.

In the first embodiment, the ground wire Wpg and the ground wire Wsg are formed as a common wire. In other words, in the electric wiring (wires W) of the drive-side pulley solenoid valve SLP and driven-side pulley solenoid valve SLS, the ground wires Wpg and Wsg are shared. The ground wire Wpg and the ground wire Wsg are coupled inside the hydraulic control circuit 70 and also inside the electronic control unit 60 and are connected by a single wire Wpsg through a wire connector 76.

As described hereinabove, in accordance with the first embodiment, the ground wires Wpg and Wsg are shared between the drive-side pulley solenoid valve SLP and the driven-side pulley solenoid valve SLS. Therefore, when a disconnection or short circuit occurs in the shared portion, the drive-side pulley 44 and the driven-side pulley 48 show substantially the same behavior. As a result, changes in the speed ratio γcvt of the continuously variable transmission 26 are suppressed and changes in vehicle behavior are also suppressed. Therefore, it is possible to suppress the degradation of drivability during the failure of the solenoid valves SLP, SLS involved in power transmission.

Further, in accordance with the first embodiment, since the electric wiring is shared, the number of wires is decreased and cost is reduced. The number of pins in the wire connector 76 is also decreased, thereby reducing the cost.

The second embodiment of the invention is explained hereinbelow. In the explanation below, the portions shared with the first embodiment and the members having the same functions are assigned with the same reference numerals and the explanation thereof is herein omitted.

Figure 3:
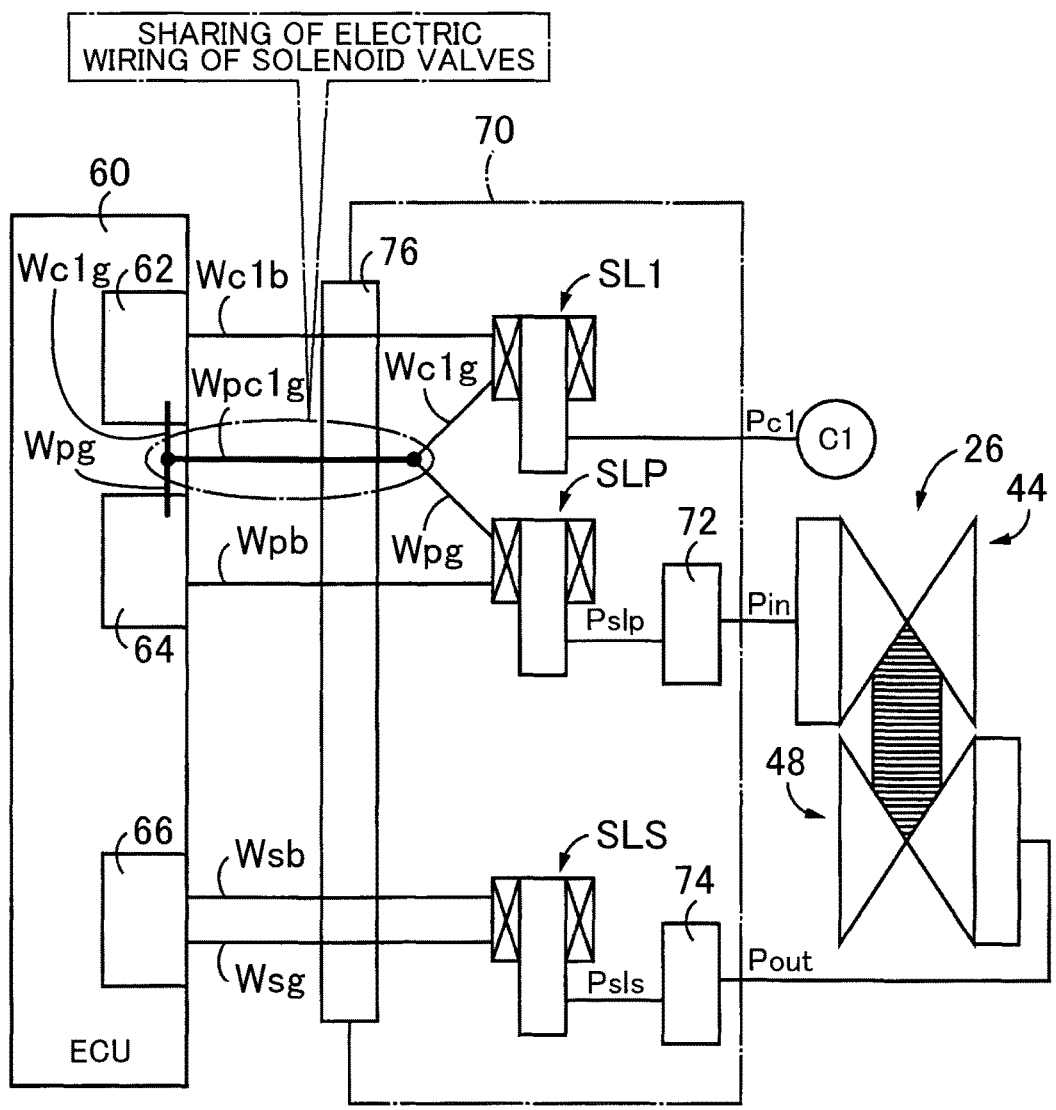
FIG. 3 illustrates a section of the electronic control unit that controls the operation relating to a hydraulic control circuit and a section of the hydraulic control circuit that controls an oil pressure relating to the continuously variable transmission and forward clutch in the hydraulic control circuit of the second embodiment of the invention.

Similarly to the above-described first embodiment, the second embodiment also provides the hydraulic control circuit 70 for the power transmission device 16 that can suppress the degradation of drivability during the failure of the solenoid valves involved in power transmission. FIG. 3 illustrates a section of the electronic control unit 60 that controls the operation relating to the hydraulic control circuit 70 and a section of the hydraulic control circuit 70 that controls an oil pressure relating to the continuously variable transmission 26 and forward clutch C1, this view being different from that of FIG. 2 illustrating the first embodiment. Sections which are different from those depicted in FIG. 2 are mainly explained hereinbelow.

In FIG. 3 illustrating the second embodiment, the ground wire Wpg and the ground wire Wc1g are formed from a common wire. In other words, in the electric wiring of the drive-side pulley solenoid valve SLP and the C1 clutch solenoid valve SL1, the ground wires Wpg and Wc1g are shared. The ground wire Wpg and the ground wire Wc1g are coupled inside the hydraulic control circuit 70 and also inside the electronic control unit 60 and are connected by a single wire Wpc1g through the wire connector 76. Further, in the second embodiment, one of the solenoid valves SLP, SLS may be a normally open solenoid valve and the other may be a normally closed solenoid valve.

As mentioned hereinabove, according to the second embodiment, the ground wires Wpg and Wc1g are shared between the drive-side pulley solenoid valve SLP and the C1 clutch solenoid valve SL1. Therefore, even when a disconnection (when the C1 clutch solenoid valve SL1 is a normally closed solenoid valve) or short circuit (when the C1 clutch solenoid valve SL1 is a normally open solenoid valve) occurs in the shared portion and a speed ratio γcvt of the continuously variable transmission 26 changes, the C1 clutch pressure Pc1 is decreased at a timing close to the change timing of the speed ratio γcvt. As a result, the forward clutch C1 is released, and therefore the power transmission path for transmitting the power of the engine 12 to the drive wheels 14 through the continuously variable transmission 26 is cut off and a change in vehicle behavior that is caused by the change in the speed ratio γcvt of the continuously variable transmission 26 is suppressed. Therefore, it is possible to suppress the degradation of drivability during the failure of the solenoid valves SLP, SL1 involved in power transmission.

Further, according to the second embodiment, since the electric wiring is shared, the number of wires is decreased and cost is reduced. The number of pins in the wire connector 76 is also decreased, thereby reducing the cost.

Figure 4:
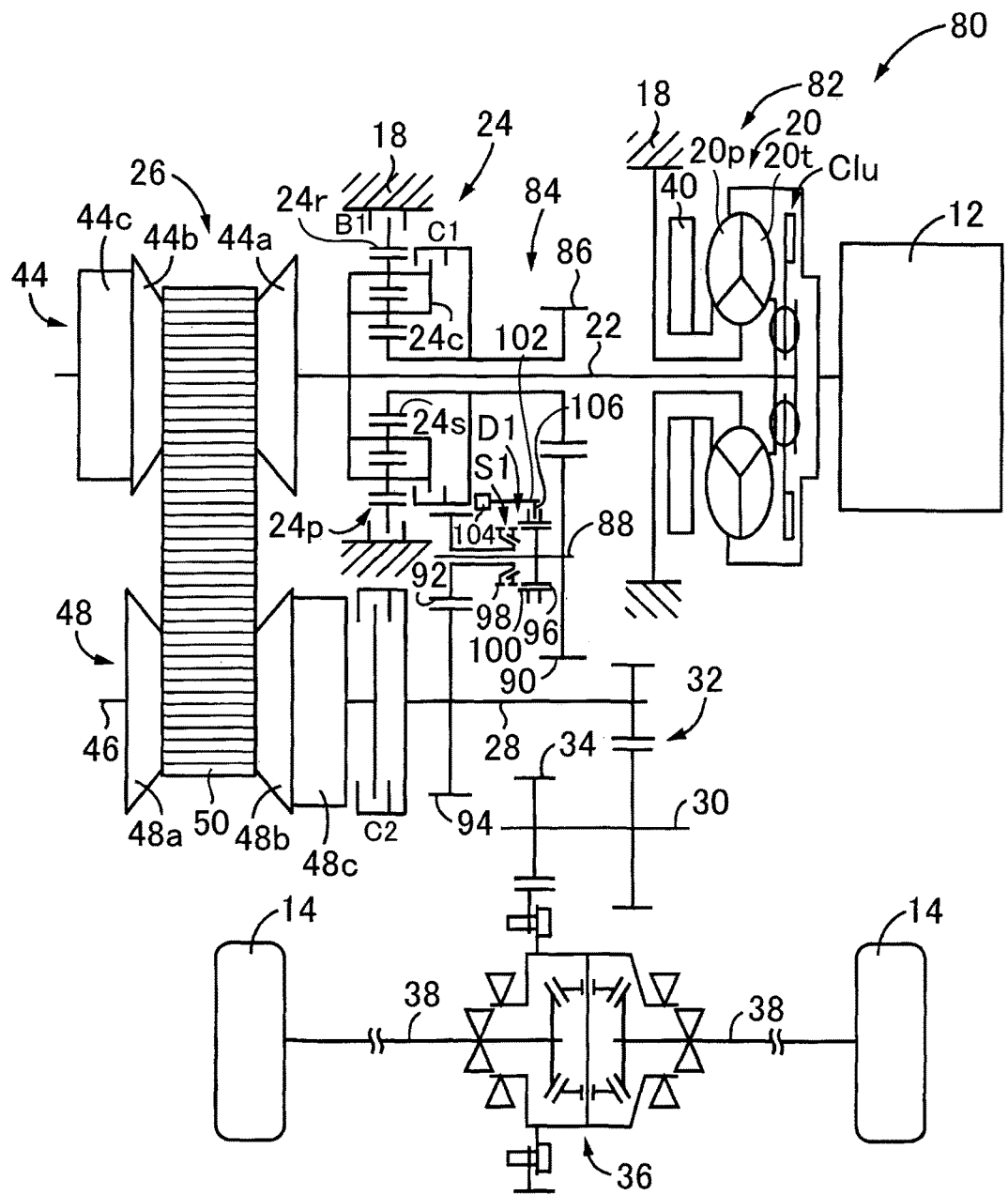
FIG. 4 illustrates the schematic configuration of the vehicle using the third embodiment of the invention.

The third embodiment of the invention is explained hereinbelow. FIG. 4 illustrates the schematic configuration of a vehicle 80 using the third embodiment, this view being different from that of FIG. 1 illustrating the first embodiment. Sections which are different from those of the vehicle 10 depicted in FIG. 1 are mainly explained hereinbelow.

In FIG. 4, the vehicle 80 is equipped with the engine 12, the drive wheels 14, and a vehicle power transmission device 82 (referred to hereinbelow as "the power transmission device 82"). The power transmission device 82 is provided between the engine 12 and the drive wheels 14. In the power transmission device 82, the torque converter 20, the input shaft 22, the continuously variable transmission 26, the forward-reverse switching device 24, a gear mechanism 84, the output shaft 28, the countershaft 30, the reduction gear device 32, the differential gear set 36, and the pair of axles 38 are provided inside the housing 18. The torque converter 20 is coupled to the engine 12. The input shaft 22 is coupled to the torque converter 20. The continuously variable transmission 26 is coupled to the input shaft 22. The forward-reverse switching device 24 is likewise coupled to the input shaft 22. The gear mechanism 84 is a power train which is coupled to the input shaft 22 through the forward-reverse switching device 24 and provided in parallel with the continuously variable transmission 26. The output shaft 28 is the output rotating member common to the continuously variable transmission 26 and the gear mechanism 84. The reduction gear device 32 is constituted by a pair of meshing gears which is provided at the output shaft 28 and the countershaft 30 so as to be incapable of rotating relative thereto. The differential gear set 36 is coupled to the gear 34 which is provided at the countershaft 30 so as to be incapable of rotating relative thereto. The pair of axles 38 is coupled to the differential gear set 36. In the power transmission device 82 configured in the above-described manner, the power of the engine 12 is successively transmitted to the pair of drive wheels 14 through the torque converter 20, continuously variable transmission 26 (or the forward-reverse switching device 24 and gear mechanism 84), reduction gear device 32, differential gear set 36, and axles 38.

Thus, the power transmission device 82 is equipped with the gear mechanism 84 as the first transmission mechanism and the continuously variable transmission 26 as the second transmission mechanism, which are provided in parallel between the engine 12 (here, means the same as the input shaft 22 which is the input rotating member that transmits the power of the engine 12) and the wheels 14 (here, means the same as the output shaft 28 which is an output rotating member that outputs the power of the engine 12 to the drive wheels 14). Therefore, the power transmission device 82 is equipped with the first power transmission path and second power transmission path. In the first power transmission path, the power of the engine 12 is transmitted from the input shaft 22 to the drive wheel 14 side (that is, to the output shaft 28) through the gear mechanism 84. In the second power transmission path, the power of the engine 12 is transmitted from the input shaft 22 to the drive wheel 14 side (that is, to the output shaft 28) through the continuously variable transmission 26. In the power transmission device 82, the first power transmission path thereof and the second power transmission path thereof are switched according to the running state of the vehicle 10. For this purpose, the power transmission device 82 is provided with a clutch mechanism that selectively switches the power transmission path for transmitting the power of the engine 12 to the drive wheel 14 side between the first power transmission path and the second power transmission path. This clutch mechanism includes the forward clutch C1, the reverse brake B1, and a CVT running clutch C2. The forward clutch C1 and the reverse brake B1 function as the first clutch mechanism that connects and disconnects the first power transmission path (in other words, the first clutch mechanism forming the first power transmission path by engagement). The CVT running clutch C2 functions as the second clutch mechanism that connects and disconnects the second power transmission path (in other words, the second clutch mechanism forming the second power transmission path by engagement). The forward clutch C1, reverse brake B1, and CVT running clutch C2 correspond to a connection-disconnection device and are each a conventional hydraulic friction engagement device.

The forward-reverse switching device 24 is provided around the input shaft 22 and concentrically with the input shaft 22 in the first power transmission path. The planetary gear device 24p is a differential mechanism having three rotating elements, namely, the carrier 24c as an input element, the sun gear 24s as an output element, and the ring gear 24r as a counterforce element. The carrier 24c is integrally coupled to the input shaft 22. The ring gear 24r is selectively coupled to the housing 18 through the reverse brake B1. The sun gear 24s is coupled to a small-diameter gear 86 which is provided coaxially with the input shaft 22 so as to be capable of rotating about the input shaft 22. Further, the carrier 24c and the sun gear 24s are selectively coupled through the forward clutch C1. Therefore, the forward clutch C1 is a clutch mechanism that selectively couples two rotating elements from among the aforementioned three rotating elements, and the reverse brake B1 is a clutch mechanism that selectively couples the counterforce element to the housing 18.

The gear mechanism 84 is provided with the small-diameter gear 86 and a large-diameter gear 90 meshing with the small-diameter gear 86. The large-diameter gear 90 is provided around a gear mechanism counter shaft 88 and coaxially with the gear mechanism counter shaft 88 so as to be incapable of rotating relative thereto. Further, the gear mechanism 84 is provided with an idler gear 92 and an output gear 94 meshing with the idler gear 92. The idler gear 92 is provided around the gear mechanism counter shaft 88 and coaxially with the gear mechanism counter shaft 88 so as to be capable of rotating relative thereto. The output gear 94 is provided around the output shaft 28 and coaxially with the output shaft 28 so as to be incapable of rotating relative thereto. The output gear 94 is larger in diameter than the idler gear 92. Therefore, the gear mechanism 84 is a power train in which one shift stage with a predetermined speed ratio is formed in the power transmission path between the input shaft 22 and the output shaft 28. In addition, a meshing clutch D1 that selectively connects and disconnects the large-diameter gear 90 and the idler gear 92 is provided therebetween around the gear mechanism counter shaft 88. The meshing clutch D1 is a clutch mechanism that is provided in the power transmission path between the forward-reverse switching device 24 (same meaning as the first clutch mechanism) and the output shaft 28 and functions as a third clutch mechanism that forms the first power transmission path (in other words, the third clutch mechanism that connects and disconnects the first power transmission path) by engaging together with the first clutch mechanism.

More specifically, the meshing clutch D1 is provided with a clutch hub 96, a clutch gear 98, and a cylindrical sleeve 100. The clutch hub 96 is provided around the gear mechanism counter shaft 88 and concentrically with the gear mechanism counter shaft 88 so as to be incapable of rotating relative thereto. The clutch gear 98 is arranged between the idler gear 92 and the clutch hub 96 and fixed to the idler gear 92. The sleeve 100 is provided to be incapable of rotating about the central axis of the gear mechanism counter shaft 88 and capable of moving relative thereto in the direction parallel to the central axis thereof by spline mating with the clutch hub 96. The inner circumferential teeth on the inner circumferential surface of the sleeve 100, which are spline mated with the outer circumferential teeth on the outer circumferential surface of the clutch hub 96, are meshed with the outer circumferential teeth of the clutch gear 98 as a result of the sleeve 100 being moved toward the clutch gear 98 side. Where the sleeve 100, which is rotated integrally, at all times, with the clutch hub 96, is meshed with the clutch gear 98, the idler gear 92 and the gear mechanism counter shaft 88 are connected. The meshing clutch D1 is also provided with a conventional synchro mesh mechanism S1 serving as a synchronization mechanism that synchronizes the rotation when the sleeve 100 and the clutch gear 98 are mated. With the meshing clutch D1 of such a configuration, as a result of operating a fork shaft 102 with an actuator 104, the sleeve 100 slides in the direction parallel to the central axis of the gear mechanism counter shaft 88 through a shift fork 106 fixedly provided at the fork shaft 102, and the engagement state and disengagement state are switched.

In the power transmission device 82, a forward power transmission path (or a reverse power transmission path) is established (formed) and the power of the engine 12 is transmitted from the input shaft 22 to the output shaft 28 through the gear mechanism 84 as a result of the forward clutch C1 (or the reverse brake B1) and the meshing clutch D1 being together engaged in the first power transmission path. In the power transmission device 82, the first power transmission path is set to a neutral state in which power transmission is cut off (power transmission cut-off state) when at least the forward clutch C1 and the reverse brake B1 are together released or at least the meshing clutch D1 is released.

The continuously variable transmission 26 is provided on the power transmission path between the input shaft 22 and the output shaft 28. The continuously variable transmission 26 is equipped with the drive-side pulley 44, the driven-side pulley 48, and the transmission belt 50. The drive-side pulley 44 is provided at the input shaft 22. The driven-side pulley 48 is provided at the driven-side rotating shaft 46. The CVT running clutch C2 is provided at the drive wheel 14 side with respect to the continuously variable transmission 26 (that is, provided between the driven-side pulley 48 and the output shaft 28) and performs selective connection/disconnection between the driven-side pulley 48 (driven-side rotating shaft 46) and the output shaft 28. In the power transmission device 82, a power transmission path is established and the power of the engine 12 is transmitted from the input shaft 22 to the output shaft 28 through the continuously variable transmission 26 as a result of engagement of the CVT running clutch C2 in the second power transmission path. In the power transmission device 82, where the CVT running clutch C2 is released, the second power transmission path is set to the neutral state.

Figure 5:
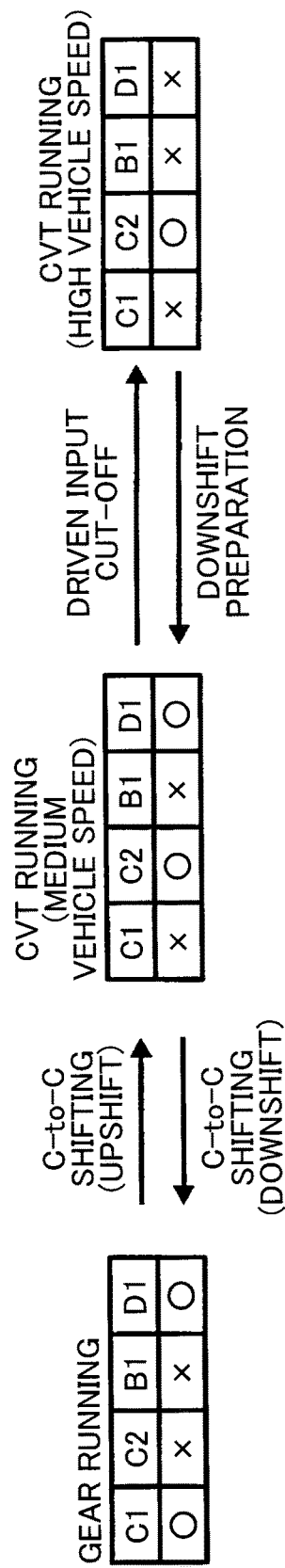
FIG. 5 illustrates how the running pattern of the power transmission device is switched in the third embodiment.

The operation of the power transmission device 82 is explained hereinbelow. FIG. 5 illustrates how the running pattern of the power transmission device 82, which is switched by the electronic control unit 110 (see FIG. 6), is switched by using an engagement table of engagement elements for each running pattern (running mode). In FIG. 5, C1 corresponds to the operation state of the forward clutch C1, C2 corresponds to the operation state of the CVT running clutch C2, B1 corresponds to the operation state of the reverse brake B1, D1 corresponds to the operation state of the meshing clutch D1, "O" indicates the engagement (connection), and "x" indicates the disengagement (disconnection).

Initially explained is a gear running pattern in which the power of the engine 12 is transmitted to the output shaft 28 through the gear mechanism 84 (that is, the running pattern in which the power is transmitted through the first power transmission path). In the gear running, as depicted in FIG. 5, for example, the forward clutch C1 and the meshing clutch D1 are engaged, but the CVT running clutch C2 and the reverse brake B1 are released.

More specifically, where the forward clutch C1 is engaged, the planetary gear device 24$p$ constituting the forward-reverse switching device 24 is rotated integrally. Therefore, the small-diameter gear 86 is rotated at a revolution speed equal to that of the input shaft 22. Further, since the small-diameter gear 86 is meshed with the large-diameter gear 90 provided at the gear mechanism counter shaft 88, the gear mechanism counter shaft 88 is also rotated in the same manner. Since the meshing clutch D1 is also engaged, the gear mechanism counter shaft 88 and the idler gear 92 are connected. Since the idler gear 92 is meshed with the output gear 94, the output shaft 28 provided integrally with the output gear 94 is rotated. Thus, where the forward clutch C1 and the meshing clutch D1 are engaged, the power of the engine 12 is successively transmitted to the output shaft 28 through the torque converter 20, forward-reverse switching device 24, and gear mechanism 84. Further, in the gear running, for example, where the reverse brake B1 and the meshing clutch D1 are engaged, but the CVT running clutch C2 and the forward clutch C1 are released, the reverse running is possible.

Further explained is a continuously variable transmission (CVT) running pattern in which the power of the engine 12 is transmitted to the output shaft 28 through the continuously variable transmission 26 (that is, the running pattern in which the power is transmitted through the second power transmission path). In the CVT running, as depicted by CVT running (high vehicle speed) in FIG. 5, for example, the CVT running clutch C2 is engaged, but the forward clutch C1, reverse brake B1, and meshing clutch D1 are released.

More specifically, where the CVT running clutch C2 is engaged, the driven-side pulley 48 and the output shaft 28 are connected. Therefore, the driven-side pulley 48 and the output shaft 28 are rotated integrally. Thus, where the CVT running clutch C2 is engaged, the power of the engine 12 is successively transmitted to the output shaft 28 through the torque converter 20 and the continuously variable transmission 26. The meshing clutch D1 is released in the CVT running (high vehicle speed) in order to prevent the drag, for example, of the gear mechanism 84 in the course of CVT running and also to prevent the constituent members (for example, a pinion gear) of the gear mechanism 84 and the planetary gear device 24$p$ from revolving at a high speed at a high vehicle speed.

The gear running is selected, for example, in a low-vehicle-speed region including the vehicle stopping state. A speed ratio γgear which is formed in the first power transmission path (that is, a speed ratio EL formed by the gear mechanism 84) is set to a value (namely, a low-side speed ratio) greater than a maximum speed ratio (that is, the lowest speed ratio which is a speed ratio on the lowest vehicle speed side which is formed by the continuously variable transmission 26) γmax formed in the second power transmission path. In other words, the continuously variable transmission 26 forms a speed ratio γcvt on the high vehicle speed side (high side) with respect to the speed ratio EL formed by the gear mechanism 84. For example, the speed ratio EL corresponds to a first-speed speed ratio γ1 which is a speed ratio γ of a first-speed shift stage in the power transmission device 82, and the lowest speed ratio γmax of the continuously variable transmission 26 corresponds to a second-speed speed ratio γ2 which is a speed ratio γ of a second-speed shift stage in the power transmission device 82. Therefore, for example, the gear running and CVT running are switched according to a shift line for switching the first-speed shift stage and second-speed shift stage in a shift map of the conventional stepped transmission. Further, for example, in the CVT running, the shifting (for example, CVT shifting, stepless shifting) in which the speed ratio γcvt is changed on the basis of a running state such as an accelerator depression amount and vehicle speed is executed by using a conventional method. In this case, when switching from the gear running to the CVT running (high vehicle speed), or from the CVT running (high vehicle speed) to the gear running, the switching is transiently performed through the CVT running (medium vehicle speed), as depicted in FIG. 5.

For example, when switching from the gear running to the CVT running (high vehicle speed), the switching is transiently performed from a state in which the forward clutch C1 and the meshing clutch D1 are engaged, this state corresponding to the gear running, to the CVT running (medium vehicle speed) which is a state in which the CVT running clutch C2 and the meshing clutch D1 are engaged. Thus, shifting (for example, clutch-to-clutch shifting (referred to hereinbelow as C-to-C shifting)) that replaces the clutch is executed such as to release the forward clutch C1 and engage the CVT running clutch C2. In this case, the power transmission path is switched from the first power transmission path to the second power transmission path, and substantially upshifting is performed in the power transmission device 82. After the power transmission path has been switched, the meshing clutch D1 is released in order to prevent the unnecessary drag of the gear mechanism 84, or the like, and the increase in revolution speed in the planetary gear device 24p (see driven-side input cut-off in FIG. 5). Thus, the meshing clutch D1 functions as a driven-side input cut-off clutch that cuts off the input from the drive wheel 14 side.

Further, for example, when switching from the CVT running (high vehicle speed) to the gear running, the switching is transiently performed from a state in which the CVT running clutch C2 is engaged to the CVT running (medium vehicle speed) which is a state in which the meshing clutch D1 is further engaged as a preparation for switching to the gear running (see the downshift preparation in FIG. 5). In the CVT running (medium vehicle speed), a state is assumed in which the rotation is also transmitted to the sun gear 24s of the planetary gear device 24p through the gear mechanism 84. Where the shifting (for example, C-to-C shifting) is executed to replace the clutches such that the CVT running clutch C2 is released and the forward clutch C1 is engaged from the CVT running (medium vehicle speed) state, the switching is performed to the gear running. In this case, the power transmission path is switched from the second power transmission path to the first power transmission path, and substantially downshifting is performed in the power transmission device 82.

Figure 6:
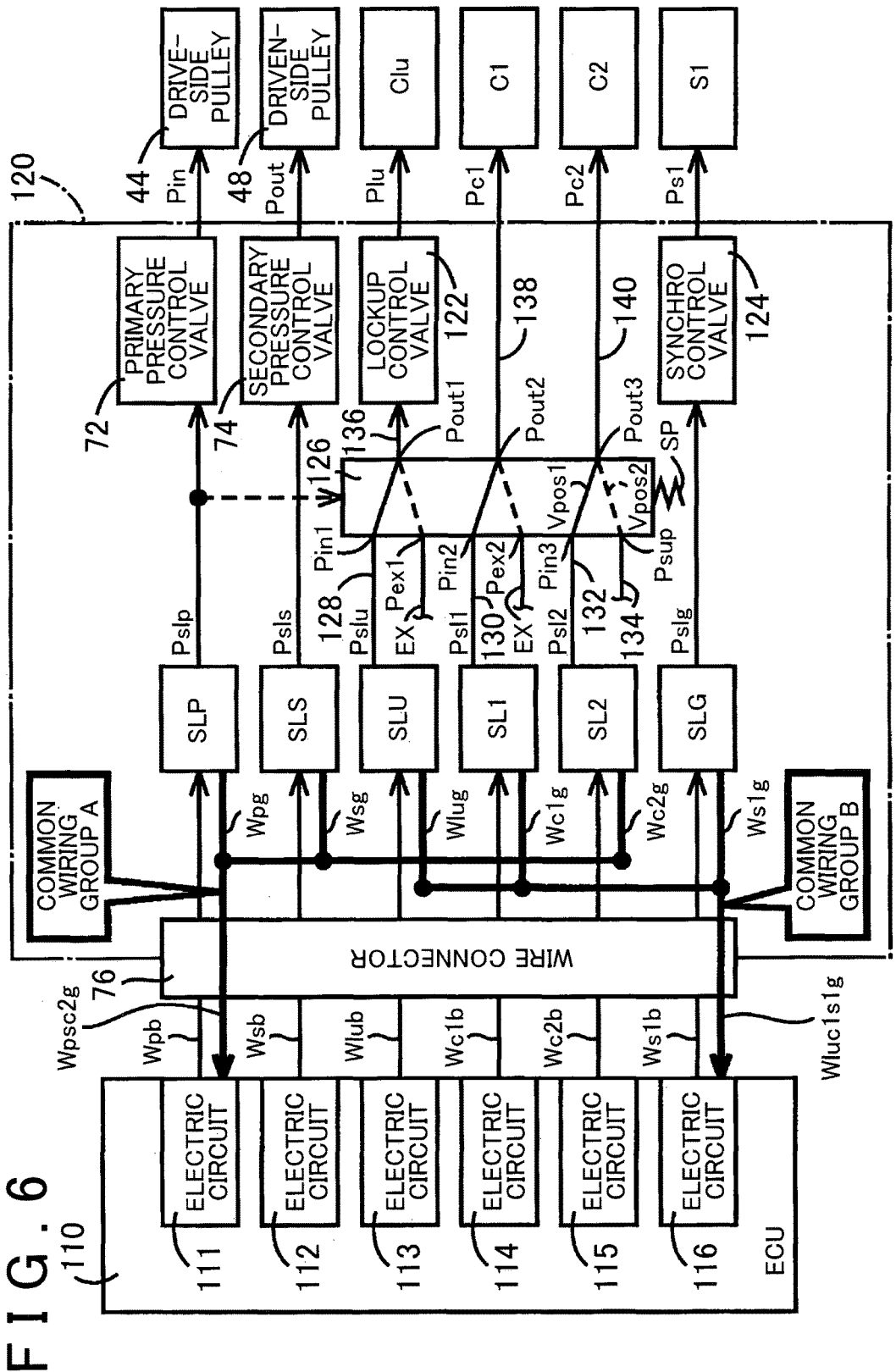
FIG. 6 illustrates a section of the electronic control unit that controls the operation relating to a hydraulic control circuit and a section of the hydraulic control circuit that controls an oil pressure relating to the continuously variable transmission, forward clutch, clutch for CVT running, meshing clutch, and lockup clutch in the hydraulic control circuit of the third embodiment.

Similarly to the above-described first embodiment, the third embodiment also provides the hydraulic control circuit 120 for the power transmission device 82 that can suppress the degradation of drivability during the failure of the solenoid valves involved in power transmission. FIG. 6 illustrates a section of the electronic control unit 110 that controls the operation relating to the hydraulic control circuit 120 and a section of the hydraulic control circuit 120 that controls an oil pressure relating to the continuously variable transmission 26, forward clutch C1, CVT running clutch C2, meshing clutch D1, and lockup clutch Clu, this view being different from that of FIG. 2 illustrating the first embodiment. In FIG. 6, the vehicle 80 is equipped with the electronic control unit 110 and the hydraulic control circuit 120.

The electronic control unit 110 is configured to include the so-called microcomputer provided, for example, with a CPU, a RAM, a ROM, and an input/output interface. The CPU executes various types of control of the power transmission device 82 by performing signal processing according to a program, which has been stored in advance in the ROM, while using the temporary storage function of the RAM. The electronic control unit 110 executes the output control of the engine 12, the shift control and belt squeezing pressure control of the continuously variable transmission 26, the engagement control of the forward clutch C1 and reverse brake B1, the switching control of the running pattern of the power transmission device 82, and the switching control of the operation state of the lockup clutch Clu.

The electronic control unit 110 can be configured, when necessary, separately for engine control and hydraulic control. Various actual values such as revolution speeds based on detection signals of sensors, such as revolution speed sensors (not depicted in the figure) provided at the vehicle 80 are supplied to the electronic control unit 110. Further, an engine output control command signal and a hydraulic control command signal are output from the electronic control unit 110. The engine output control command signal is a signal for the output control of the engine 12. The hydraulic control command signal is a signal for the hydraulic control relating to the shift in the continuously variable transmission 26. The hydraulic control command signal is also a signal for controlling the forward-reverse switching device 24, CVT running clutch C2, and meshing clutch D1 relating to switching of the running pattern of the power transmission device 82. The hydraulic control command signal is also a signal for switching the operation state of the lockup clutch Clu.

The hydraulic control circuit 120 is provided with a drive-side pulley solenoid valve SLP, a driven-side pulley solenoid valve SLS, a C1 clutch solenoid valve SL1, a C2 clutch solenoid valve SL2, a lockup clutch solenoid valve SLU, and a synchro solenoid valve SLG. The C1 clutch solenoid valve SL1 functions as a first clutch mechanism solenoid valve that controls a C1 clutch pressure Pc1 which is the first clutch pressure supplied to the forward clutch C1. The C2 clutch solenoid valve SL2 functions as a second clutch mechanism solenoid valve that controls a C2 clutch pressure Pc2 which is the second clutch pressure supplied to the CVT running clutch C2. The lockup clutch solenoid valve SLU controls a clutch pressure Plu supplied to the lockup clutch Clu. The synchro solenoid valve SLG controls a synchro control supplied to an Ps1 supplied to an actuator 104 that actuates the synchro mesh mechanism S1. The hydraulic control circuit 120 is also provided with the primary pressure control valve 72, the secondary pressure control valve 74, a lockup control valve 122, a synchro control valve 124, a fail-safe valve 126; and the wire connector 76.

The solenoid valves SLP, SLS, SL1, SL2, SLU, and SLG are each a linear solenoid valve driven by a hydraulic control command signal (drive current) output from the electronic control unit 110. The solenoid valves SLP, SLS are each a normally open solenoid valve. The solenoid valves SL1, SL2, SLU, SLG are each a normally closed solenoid valve. The lockup control valve 122 adjusts the lockup clutch pressure Plu when operated on the basis of the control oil pressure Pslu output from the lockup clutch solenoid valve SLU. The synchro control valve 124 adjusts the synchro control pressure Ps1 when operated on the basis of the control oil pressure Pslg output from the synchro solenoid valve SLG.

The fail-safe valve 126 has a spring SP, a first input port Pin1, a second input port Pin2, a third input port Pin3, a first discharge port Pex1, a second discharge port Pex2, a supply port Psup, a first output port Pout1 selectively communicating with the first input port Pin1 and the first discharge port Pex1, a second output port Pout2 selectively communicating with the second input port Pin2 and the second discharge port Pex2, and a third output port Pout3 selectively communicating with the third input port Pin3 and the supply port Psup. The fail-safe valve 126 is configured of a conventional spool valve of a system which is provided with a spool valve element, which is unidirectionally biased by the spring SP and accommodated inside a valve body to be slidable with a predetermined movement stroke, and in which the first input port Pin1 and the first output port Pout1 are communicated with each other, the second input port Pin2 and the second port Pout2 are communicated with each other, and the third input port Pin3 and the third output port Pout3 are communicated with each other, or the first discharge port Pex1 and the first output port Pout1 are communicated with each other, the second discharge port Pex2 and the second output port Pout2 are communicated with each other, and the supply port Psup and the third output port Pout3 are communicated with each other in response to the movement of the spool valve element from one end to the other end of the sliding stroke.

A first oil passage 128 for supplying a control oil pressure Pslu from the lockup clutch solenoid valve SLU is connected to the first input port Pin1. A second oil passage 130 which is an oil passage for supplying an output oil pressure Psl1 of the C1 clutch solenoid valve SL1 is connected to the second input port Pin2. A third oil passage 132 which is an oil passage for supplying an output oil pressure Psl2 of the C2 clutch solenoid valve SL2 is connected to the third input port Pin3. A discharge oil passage EX is connected to the first discharge port Pex1. A discharge oil passage EX is connected to the second discharge port Pex2. A constant-pressure oil passage 134 for supplying a modulator oil pressure Pm is connected to the supply port Psup. A fourth oil passage 136 for supplying the control oil pressure Pslu to the lockup control valve 122 is connected to the first output port Pout1. A fifth oil passage 138 which is an oil passage for supplying the C1 clutch pressure Pc1 is connected to the second output port Pout2. A sixth oil passage 140 which is an oil passage for supplying the C2 clutch pressure Pc2 is connected to the second output port Pout2.

The modulator oil pressure Pm is an oil pressure adjusted to a constant oil pressure on the basis of the output oil pressure of a predetermined linear solenoid valve by a modulator valve (not depicted in the figure), for example, by taking a line oil pressure as a source pressure; the modulator oil pressure is not transferred through the C2 clutch solenoid valve SL2. The modulator oil pressure Pm is also sufficiently higher than the oil pressure that completely engages the CVT running clutch C2 and can engage the CVT running clutch C2. Therefore, the constant-pressure oil passage 134 is for supplying an oil pressure which is not transferred through the C2 clutch solenoid valve SL2 and can engage the CVT running clutch C2. Further, the line oil pressure is obtained by taking, for example, a working oil pressure output (generated) from the oil pump 40 as a source pressure and adjusting to a value corresponding to an input torque Tin (torque on the input shaft 22) on the basis of the output oil pressure of the predetermined linear solenoid valve with a relief-type primary regulator valve (not depicted in the figure).

The fail-safe valve 126 of such a configuration is selectively switched to a first valve position Vpos1 (see a solid line) in which the third oil passage 132 is connected to the sixth oil passage 140 and a second valve position Vpos2 (see a broken line) in which the constant-pressure oil passage 134 is connected to the sixth oil passage 140, on the basis of the output oil pressure Pslp (has the same meaning as the control oil pressure Pslp) of the drive-side pulley solenoid valve SLP. Therefore, the drive-side pulley solenoid valve SLP functions as a normally open fail-safe solenoid valve.

The spring SP of the fail-safe valve 126 generates a biasing force for switching the fail-safe valve 126 to the first valve position Vpos1. The output oil pressure Pslp of the drive-side pulley solenoid valve SLP acts upon the fail-safe valve 126 against the biasing force of the spring SP so as to generate a thrust for switching the fail-safe valve 126 in the direction opposite to the switching direction induced by the biasing force of the spring SP. Where a maximum oil pressure Pslpmax of the drive-side pulley solenoid valve SLP is caused to act, the fail-safe valve 126 is switched to the second valve position Vpos2. Since the drive-side pulley solenoid valve SLP is a normally open linear solenoid valve, the maximum oil pressure Pslpmax is output when the valve is not energized (non-energized state) or when the drive current is zero or close to zero. Therefore, the fail-safe valve 126 is switched to the second valve position Vpos2 at the time of a failure (on-fail) such that the drive-side pulley solenoid valve SLP outputs the maximum oil pressure Pslpmax. As a result, at the on-fail-time of the drive-side pulley solenoid valve SLP, the primary pressure Pin to the drive-side pulley 44 is ensured and the constant-pressure oil passage 134 is connected to the sixth oil passage 140, whereby the modulator oil pressure Pm is forcibly supplied to the CVT running clutch C2 and the CVT running clutch C2 is engaged. Therefore, the second power transmission path is formed. Thus, the CVT running can be performed and a drive power is ensured. Further, when all of the solenoid valves SLP, SLS, SL1, SL2, SLU, and SLG are in a non-energized state due to the failure of the electronic control unit 110, the fail-safe valve 126 is switched to the second valve position Vpos2 and the primary pressure Pin is ensured by the on-fail of the drive-side pulley solenoid valve SLP, and secondary pressure Pout to the driven-side pulley 48 is ensured by the on-fail of the driven-side pulley solenoid valve SLS. Therefore, the drive power is likewise ensured.

Further, in the normal state of the drive-side pulley solenoid valve SLP, switching control of the continuously variable transmission 26 is performed within a drive current range in which the maximum oil pressure Pslpmax or an oil pressure close to the maximum oil pressure Pslmax is not reached, so that the fail-safe valve 126 be maintained at the first valve position Vpos1. Where a failure in a high-speed running mode of the vehicle 80 is considered, when the drive-side pulley solenoid valve SLP is on-fail, it is desirable that the second power transmission path, in which the speed ratio γ is formed on the vehicle speed side higher than in the first power transmission path, be formed. For this purpose, the fail-safe valve 126 is configured, as described hereinabove, such that the second power transmission path is formed when the drive-side pulley solenoid valve SLP is on-fail.

In the first valve position Vpos1 of the fail-safe valve 126, the second oil passage 130 is connected to the fifth oil passage 138, and in the second valve position Vpos2, the fifth oil passage 138 is connected to the discharge oil passage EX. As a result, when the drive-side pulley solenoid valve SLP is on-fail, since the fifth oil passage 138 is connected to the discharge oil passage EX, the C1 clutch pressure Pc1 is not supplied to the forward clutch C1 and the release of the forward clutch C1 is maintained (or the C1 clutch pressure Pc1 is discharged from the forward clutch C1 and the forward clutch C1 is released substantially simultaneously with the engagement operation of the CVT running clutch C2). Therefore, the first power transmission path is set to the power transmission cut-off state. As a result, an interlock in which the first power transmission path and the second power transmission path are formed together (or a tie-up in which the engagement of the CVT running clutch C2 and the engagement of the forward clutch C1 overlap) is avoided.

In the first valve position Vpos1 of the fail-safe valve 126, the first oil passage 128 is connected to the fourth oil passage 136, and in the second valve position Vpos2, the fourth oil passage 136 is connected to the discharge oil passage EX. As a result, when the drive-side pulley solenoid valve SLP is on-fail, since the fourth oil passage 136 is connected to the discharge oil passage EX, the lockup clutch Clu is maintained in a lockup OFF state or set to the lockup OFF state. Therefore, when the drive-side pulley solenoid valve SLP is on-fail, an engine stall is avoided.

The wire connector 76 is a conventional connector that connects and disconnects, in an out of the hydraulic control circuit 120, wires W that electrically connect the solenoid valves SLP, SLS, SL1, SL2, SLU; and SLG to the electronic control unit 110. The wires W are, for example, a power supply wire Wpb and a ground wire Wpg for a drive current of the drive-side pulley solenoid valve SLP which is output from an electric circuit 111 incorporated in the electronic control unit 110. The wires W are also, for example, a power supply wire Wsb and a ground wire Wsg for a drive current of the driven-side pulley solenoid valve SLS which is output from an electric circuit 112 incorporated in the electronic control unit 110. The wires W are also, for example, a power supply wire Wlub and a ground wire Wlug for a drive current of the lockup clutch solenoid valve SLU which is output from an electric circuit 113 incorporated in the electronic control unit 110. The wires W are also, for example, a power supply wire Wc1b and a ground wire Wc1g for a drive current of the C1 clutch solenoid valve SL1 which is output from an electric circuit 114 incorporated in the electronic control unit 110. The wires W are also, for example, a power supply wire Wc2b and a ground wire Wc2g for a drive current of the C2 clutch solenoid valve SL2 which is output from an electric circuit 115 incorporated in the electronic control t 110. The wires W are also, for example, a power supply wire Ws1b and a ground wire Ws1g for a drive current of the synchro solenoid valve SLG which is output from an electric circuit 116 incorporated in the electronic control unit 110.

In the third embodiment, the ground wire Wpg, the ground wire Wsg, and the ground wire Wc2g are formed as a common wire. In other words, in the electric wiring of the drive-side pulley solenoid valve SLP, the driven-side pulley solenoid valve SLS, and the C2 clutch solenoid valve SL2, the ground wires Wpg, Wsg, and Wc2g are shared. The ground wire Wpg, the ground wire Wsg, and the ground wire Wc2g are coupled inside the hydraulic control circuit 120 and also inside the electronic control unit 110 and are connected by a single wire Wpsc2g through the wire connector 76 (see a common wiring group A).

Further, in the third embodiment, the ground wire Wlug, the ground wire Wc1g, and the ground wire Ws1g are formed as a common wire. In other words, in the electric wiring of the lockup clutch solenoid valve SLU, the C1 clutch solenoid valve SL1, and the synchro solenoid valve SLG, the ground wires Wlug, Wc1g, and Ws1g are shared. The ground wire Wlug, the ground wire Wc1g, and the ground wire Ws1g are coupled inside the hydraulic control circuit 120 and also inside the electronic control unit 110 and are connected by a single wire Wluc1s1g through the wire connector 76 (see a common wiring group B).

Where a disconnection occurs in the common wiring group A depicted in FIG. 6, an output oil pressure Psl2 is not supplied from the C2 clutch solenoid valve SL2, but since the fail-safe valve 126 is switched to the second valve position Vpos2 by the on-fail of the drive-side pulley solenoid valve SLP, the CVT running clutch C2 is engaged by the supply of the modulator oil pressure Pm. Since the driven-side pulley solenoid valve SLS is also on-fail at the same time, the second power transmission path is formed in which the speed ratio γ is at a comparatively high side and the drive power can be ensured by the CVT running (that is, the retreat running based on the CVT running is possible). In this case, since the drive-side pulley solenoid valve SLP and the driven-side pulley solenoid valve SLS are together on-fail, the drive-side pulley 44 and the driven-side pulley 48 show substantially the same behavior and changes in vehicle behavior are suppressed. In addition, since the release of the forward clutch C1 is maintained or the forward clutch C1 is released as a result of the fail-safe valve 126 being switched to the second valve position Vpos2, an interlock (or a tie-up) is avoided. Further, since the lockup OFF state of the lockup clutch Clu is maintained or the lockup clutch Clu is set to the lockup OFF state as a result of the fail-safe valve 126 being switched to the second valve position Vpos2, an engine stall is avoided.

Where a disconnection occurs in the common wiring group B depicted in FIG. 6, the gear running becomes impossible, but the retreat running based on the CVT running is made possible by the solenoid valves SLP, SLS, and SL2 which have not failed.

Where a mode is used in which the drive currents are caused by the electronic control unit 110 not to be output from the electric circuits 111 to 116 when a short circuit occurs in the common wiring group A depicted in FIG. 6 or when a short circuit occurs in the common wiring group B depicted in FIG. 6, the retreat running based on the CVT running is enabled in the same manner as in the above-described case in which all of the solenoid valves SLP, SLS, SL1, SL2, SLU, and SLG are set to the non-energized state by the failure of the electronic control unit 110.

Where only the actuation of the functions of the above-described fail-safe valve 126 is considered at the time of disconnection in the common wiring group A, the ground wire Wpg and the ground wire Wc2g may be formed as a common wire in the common wiring group A, without including the ground wire Wsg. In other words, the ground wires Wpg and Wc2g in the electric wiring of the drive-side pulley solenoid valve SLP and the C2 clutch solenoid valve SL2 may be shared. Further, the common wiring group B may not be configured. Where the common wiring group A does not include the ground wire Wsg, the driven-side pulley solenoid valve SLS can output the control oil pressure Psls even when a disconnection occurs in the common wiring group A. Therefore, the driven-side pulley solenoid valve SLS may be a normally closed solenoid valve.

As mentioned hereinabove, according to the third embodiment, the ground wires Wpg and Wc2g are shared between the drive-side pulley solenoid valve SLP and the C2 clutch solenoid valve SL2. Therefore, even when a disconnection occurs in the shared portion and the output oil pressure Psl2 of the C2 clutch solenoid valve SL2 decreases, the fail-safe valve 126 is switched to the second valve position Vpos2 by the drive-side pulley solenoid valve SLP which is disconnected at substantially the same time and outputs the maximum oil pressure Pslpmax. As a result, the constant-pressure oil passage 134 for supplying the modulator oil pressure Pm which can engage the CVT running clutch C2 is connected to the sixth oil passage 140 that supplies the C2 clutch pressure Pc2. Therefore, the CVT running clutch C2 is engaged and the drive power can be ensured (a torque can be transmitted to the drive wheels 14) in the second power transmission path. As a result, it is possible to suppress the degradation of drivability during the failure of the solenoid valves SLP, SL2 involved in power transmission.

Further, according to the third embodiment, in the first valve position Vpos1 of the fail-safe valve 126, the second oil passage 130 is connected to the fifth oil passage 138, and in the second valve position Vpos2, the fifth oil passage 138 is connected to the discharge oil passage EX. Therefore, when a disconnection occurs in the shared portion between the drive-side pulley solenoid valve SLP, and the C2 clutch solenoid valve SL2 and the fail-safe valve 126 is switched to the second valve position Vpos2, the forward clutch C1 is reliably released. As a result, the interlock (tie-up) caused by the connection of the first power transmission path in addition to the second power transmission path can be prevented (avoided).

Further, according to the third embodiment, even when a disconnection occurs in the shared portion between the drive-side pulley solenoid valve SLP and the C2 clutch solenoid valve SL2, a torque can be transmitted to the drive wheels 14 in the second power transmission path including the continuously variable transmission 26.

Further, according to the third embodiment, since the normally open fail-safe solenoid valve is the drive-side pulley solenoid valve SLP, even when a disconnection occurs in the shared portion between the drive-side pulley solenoid valve SLP and the C2 clutch solenoid valve SL2, the primary pressure Pin supplied to the drive-side pulley 44 is output from the drive-side pulley solenoid valve SLP and a torque can be transmitted to the drive wheels 14 in the second power transmission path including the continuously variable transmission 26.

Further, according to the third embodiment, since the ground wires Wpg, Wsg, and Wc2g are shared in the electric wiring of the drive-side pulley solenoid valve SLP, driven-side pulley solenoid valve SLS, and C2 clutch solenoid valve SL2 even when a disconnection occurs in the shared portion between the drive-side pulley solenoid valve SLP, driven-side pulley solenoid valve SLS, and C2 clutch solenoid valve SL2, a torque can be transmitted to the drive wheels 14 in the second power transmission path including the continuously variable transmission 26. Further, since the drive-side pulley 44 and the driven-side pulley 48 show substantially the same behavior, changes in the speed ratio γcvt of the continuously variable transmission 26 are suppressed and changes in vehicle behavior are also suppressed.

Further, according to the third embodiment, the continuously variable transmission 26 forms the speed ratio γcvt which is higher than the speed ratio EL formed by the gear mechanism 84. Therefore, when a disconnection occurs in the shared portion between the drive-side pulley solenoid valve SLP and the C2 clutch solenoid valve SL2, a torque can be transmitted to the drive wheels 14 in the second power transmission path in which the speed ratio γ is on a comparatively high speed side. As a result, the high-speed running is easily maintained during a failure in the high-speed running of the vehicle 80.

Further, according to the third embodiment, since the electric wiring is shared, the number of wires is decreased and cost is reduced. The number of pins in the wire connector 76 is also decreased, thereby reducing the cost.

The first to third embodiments of the invention are explained in detail hereinabove with reference to the appended drawings, but the invention can be also used in other forms thereof.

For example, in the first to third embodiments, the electric wiring is shared by sharing the ground wire, but the invention can be also used when the power supply wires are shared instead of the ground wires.

Further, in the first and second embodiments, the forward clutch C1 is used as the clutch mechanism when explaining the sharing of electric wires, but the invention can be also used when the reverse brake B1 and a solenoid valve corresponding to the reverse brake B1 are used instead of, or in addition to the forward clutch C1 and the C1 clutch solenoid valve SL1. Where the clutch C is provided on the rear-stage side (output side) of the continuously variable transmission 26, the invention can be also used when the clutch C and a solenoid valve corresponding to the clutch C are used instead of, or in addition to the forward clutch C1 and the C1 clutch solenoid valve SL1.

Further, in the first and second embodiments, the electric wirings of two solenoid valves are shared, but the electric wirings of at least two solenoid valves may be shared, and the electric wiring of the solenoid valve other than the two solenoid valves indicated in the embodiments may be also shared. This approach can be also used in the third embodiment. In other words, in the third embodiment, the electric wirings of at least two solenoid valves, namely, the drive-side pulley solenoid valve SLP and the C2 clutch solenoid valve SL2, may be shared. Where a mode is used in which the fail-safe valve 126 is switched to the second valve position Vpos2 by the maximum oil pressure Pslsmax when the driven-side pulley solenoid valve SLS is on-fail, the electric wirings of at least two solenoid valves, namely, the driven-side pulley solenoid valve SLS and the C2 clutch solenoid valve SL2, may be shared. In this case, the driven-side pulley solenoid valve SLS functions as a normally open fail-safe solenoid valve.

Further, in the third embodiment, the gear mechanism 84 is presented as an example of the first transmission mechanism and the continuously variable transmission 26 is presented as an example of the second transmission mechanism, and the retreat running based on the CVT running is enabled in the second power transmission path which is formed through the continuously variable transmission 26, but this embodiment is not limiting. For example, the retreat running based on the gear running may be also enabled by switching the valve position during the on-fail of the normally open fail-safe solenoid valve, imparting the function of forcibly supplying the engagement oil pressure to the actuator 104, which actuates the forward clutch C1 and the synchro mesh mechanism S1, to the fail-safe valve 126, and sharing the electric wiring of the normally open fail-safe solenoid valve and the C1 clutch solenoid valve SL1. Further, the first transmission mechanism and/or the second transmission mechanism may be another transmission mechanism such as a multistage transmission of a planetary gear type or a dual clutch transmission (DCT).

Further, in the third embodiment, when a disconnection occurs in the common wiring group B depicted in FIG. 6, the gear running is impossible, but the retreat running based on the CVT running is enabled by the solenoid valves SLP, SLS, and SL2 that have not failed, but this embodiment is not limiting. For example, where the C2 clutch solenoid valve SL2 is also responsible for controlling the reverse brake B1, the retreat running based on the reverse running is also enabled by forcibly supplying a reverse pressure, which is commonly used, to the actuator 104 which actuates the synchro mesh mechanism S1.

Further, in the third embodiment, the modulator oil pressure Pm is supplied to the constant-pressure oil passage 134, but such a configuration is not limiting. For example, another oil pressure, such as a line oil pressure, may be supplied to the constant-pressure oil passage 134.

In each of the above-described embodiments, the C1 clutch solenoid valve SL1 or the C2 clutch solenoid valve SL2 directly controls the C1 clutch pressure Pc1 or the C2 clutch pressure Pc2, respectively, but a configuration in which the control is performed via a control valve is also possible.

Further, in each of the above-described embodiments, the gear mechanism 84 is a power train in which one shift stage is formed, but such a configuration is not limiting. For example, the gear mechanism 84 may be a power train in which a plurality of shift stages that differ in a speed ratio γgear is formed. In other words, the gear mechanism 84 may be a stepped transmission shiftable to two or more stages.

Further, in each of the above-described embodiments, from the standpoint of the speed ratio γ, the gear mechanism 84 is a power train forming a speed ratio EL on a low side with respect to the lowest speed ratio γmax of the continuously variable transmission 26, but such a configuration is not limiting. For example, the gear mechanism 84 may be a power train forming a speed ratio EH on a high side with respect to the highest speed ratio γmin of the continuously variable transmission 26, and also a speed ratio EL on a low side. The invention can be also used with such gear mechanism 84. The same is true when the gear mechanism 84 is a power train in which a plurality of shift stages are formed.

Further, in each of the above-described embodiments, the engine 12 is described as a drive power source, but such a configuration is not limiting. For example, a diesel engine or a gasoline engine, such as an internal combustion engine, can be used as the drive power source, and another prime mover, such as an electric motor can be also used individually or in combination with the engine 12. The torque converter 20 is described by way of example as a fluid transmission device, but such a configuration is not limiting. For example, another fluid transmission device such as a fluid coupling which has no torque amplification action may be used instead of the torque converter 20. Further, the torque converter 20 may not necessarily be installed. A transmission belt 50 is described as the transmission element of the continuously variable transmission 26, but such a configuration is not limiting. For example, a transmission chain may be also used as the transmission element. In this case, the continuously variable transmission mechanism is a chain-type continuously variable transmission. However, broadly speaking, the chain-type continuously variable transmission may be included in the concept of the belt-type continuously variable transmission.

Described hereinabove are merely exemplary embodiments, and the invention can be implemented in a variety of forms changed or modified on the basis of knowledge of a person skilled in the art.

What is claimed is:

1. A hydraulic control circuit for a vehicle power transmission device, the vehicle power transmission device including:
a continuously variable transmission mechanism having a drive-side pulley, a driven-side pulley, and a transmission element wound around the drive-side pulley and the driven-side pulley; and a clutch mechanism that connects and disconnects a power transmission path for transmitting power of a drive power source to drive wheels through the continuously variable transmission mechanism, the hydraulic control circuit comprising:
a drive-side pulley solenoid valve configured to control an oil pressure supplied to the drive-side pulley;
a driven-side pulley solenoid valve configured to control an oil pressure supplied to the driven-side pulley; and
a clutch mechanism solenoid valve configured to control an oil pressure supplied to the clutch mechanism, wherein
in electric wiring of at least two solenoid valves among the drive-side pulley solenoid valve, the driven-side pulley solenoid valve, and the clutch mechanism solenoid valve, a ground wire is shared between the at least two solenoid valves and an electric circuit incorporated in an electronic control unit provided in a vehicle.

2. The hydraulic control circuit according to claim 1, wherein the drive-side pulley solenoid valve and the driven-side pulley solenoid valve are each a normally open solenoid valve.

3. The hydraulic control circuit according to claim 1, wherein the drive-side pulley solenoid valve and the driven-side pulley solenoid valve are each a normally closed solenoid valve.

4. A hydraulic control circuit for a vehicle power transmission device, the vehicle power transmission device including:
a first transmission mechanism and a second transmission mechanism provided in parallel between an input rotating member to which power of a drive power source is transmitted and an output rotating member that outputs the power to drive wheels; a first clutch mechanism that connects and disconnects a first power transmission path for transmitting power of the drive power source to the drive wheels through the first transmission mechanism; and a second clutch mechanism that connects and disconnects a second power transmission path for transmitting power of the drive power source to the drive wheels through the second transmission mechanism, the hydraulic control circuit comprising:
a fail-safe solenoid valve that is a normally open solenoid valve;
a first clutch mechanism solenoid valve configured to control a first clutch oil pressure supplied to the first clutch mechanism;
a second clutch mechanism solenoid valve configured to control a second clutch oil pressure supplied to the second clutch mechanism, the second clutch mechanism solenoid valve being a normally closed solenoid valve;
a fail-safe valve configured to switch selectively to a first valve position and a second valve position based on an output oil pressure of the fail-safe solenoid valve and to switch to the second valve position at a time of a failure in which the fail-safe solenoid valve outputs a maximum oil pressure, an oil passage configured to supply an output oil pressure of the second clutch mechanism solenoid valve being connected to an oil passage configured to supply the second clutch oil pressure in the first valve position, and an oil passage configured to supply an oil pressure that is not transferred through the second clutch mechanism solenoid valve and is able to engage the second clutch mechanism being connected to the oil passage configured to supply the second clutch oil pressure in the second valve position, wherein
in electric wiring of the fail-safe solenoid valve and the second clutch mechanism solenoid valve, a ground wire is shared, the ground wire being between the fail-safe solenoid valve and the second clutch mechanism solenoid valve.

5. The hydraulic control circuit according to claim 4, wherein
the fail-safe valve is configured to: (i) connect an oil passage configured to supply an output oil pressure of the first clutch mechanism solenoid valve to an oil passage configured to supply the first clutch oil pressure in the first valve position, and (ii) connect the oil passage configured to supply the first clutch oil pressure to a discharge oil passage in the second valve position.

6. The hydraulic control circuit according to claim 4, wherein
the second transmission mechanism is a continuously variable transmission mechanism having a drive-side pulley, a driven-side pulley, and a transmission element wound around the drive-side pulley and the driven-side pulley.

7. The hydraulic control circuit according to claim 6, wherein
the fail-safe solenoid valve is a drive-side pulley solenoid valve configured to control an oil pressure supplied to the drive-side pulley.

8. The hydraulic control circuit according to claim 7, further comprising
a driven-side pulley solenoid valve configured to control an oil pressure supplied to the driven-side pulley, the driven-side pulley solenoid valve being a normally open solenoid valve, wherein
in electric wiring of the drive-side pulley solenoid valve, the driven-side pulley solenoid valve, and the second clutch mechanism solenoid valve, either one of a power supply wire and a ground wire is shared, the power supply wire being between electric circuits, the ground wire being between the drive-side pulley solenoid valve, the driven-side pulley solenoid valve and the second clutch mechanism solenoid valve.

9. The hydraulic control circuit according to claim 4, wherein
the second transmission mechanism provides a speed ratio on a higher vehicle speed side than a speed ratio provided by the first transmission mechanism.

* * * * *